Figure 1:
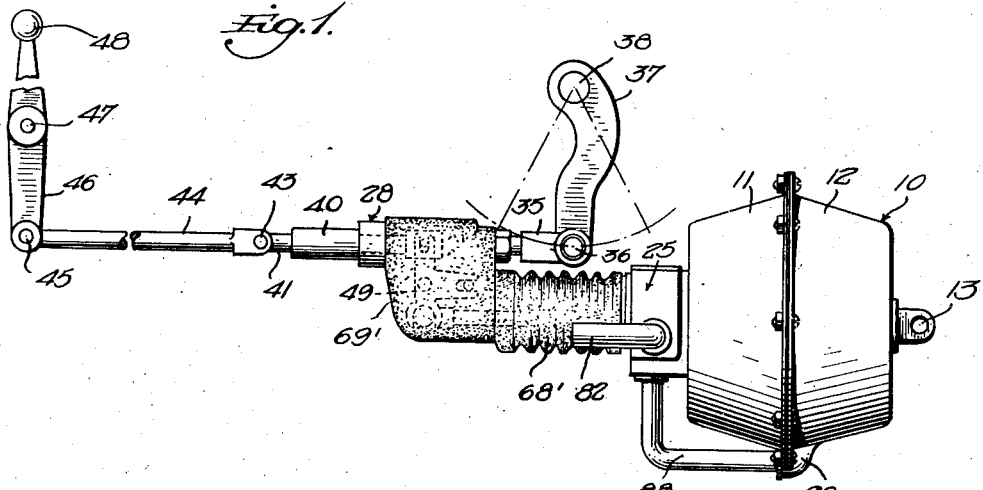

Jan. 12, 1943.　　　H. BAADE　　　2,307,910
POWER MECHANISM
Filed Feb. 7, 1939　　　4 Sheets-Sheet 1

Inventor
HENRY BAADE
By C. L. Barker
Attorney

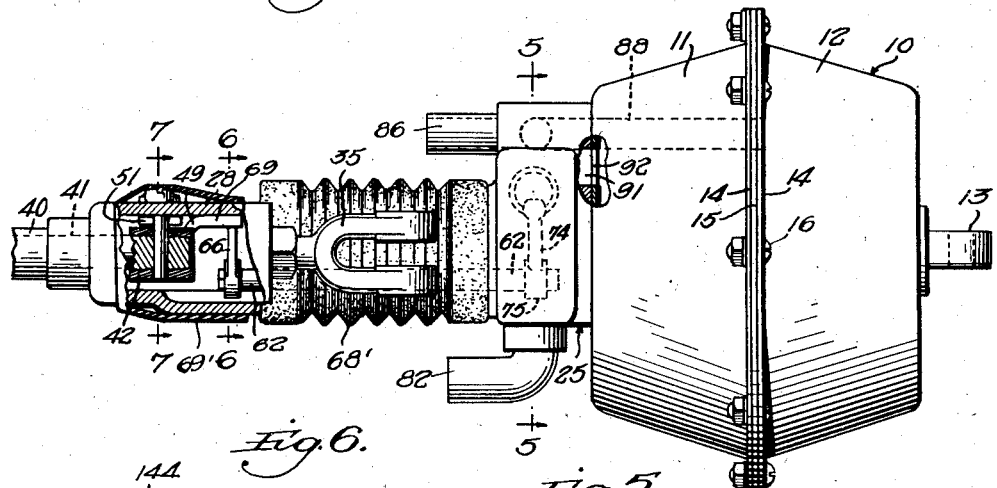
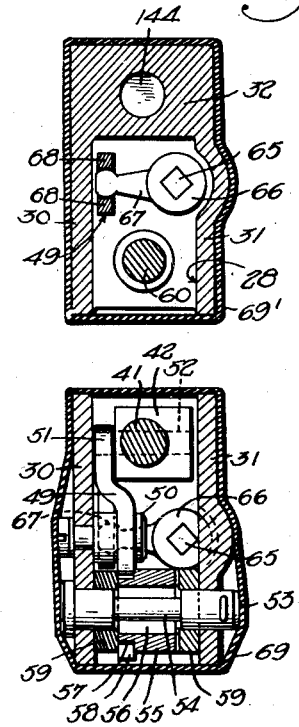
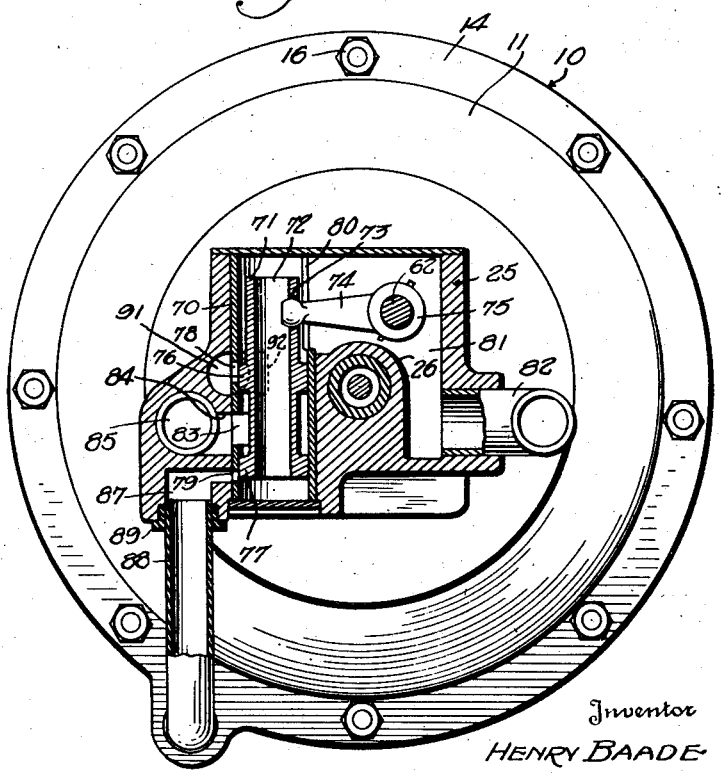

Jan. 12, 1943.  H. BAADE  2,307,910
POWER MECHANISM
Filed Feb. 7, 1939  4 Sheets-Sheet 3
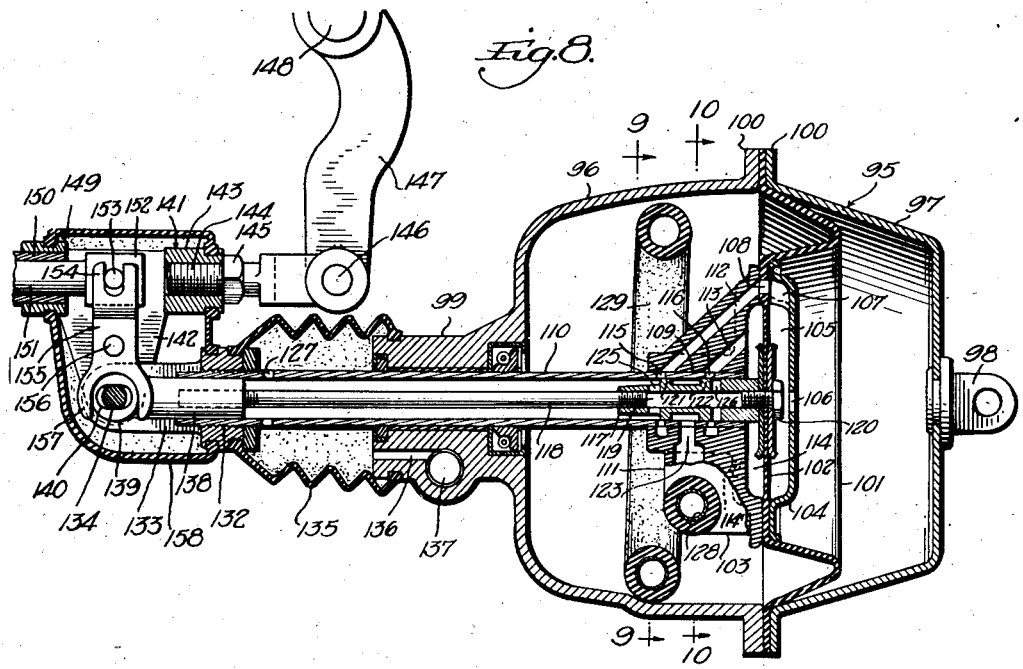
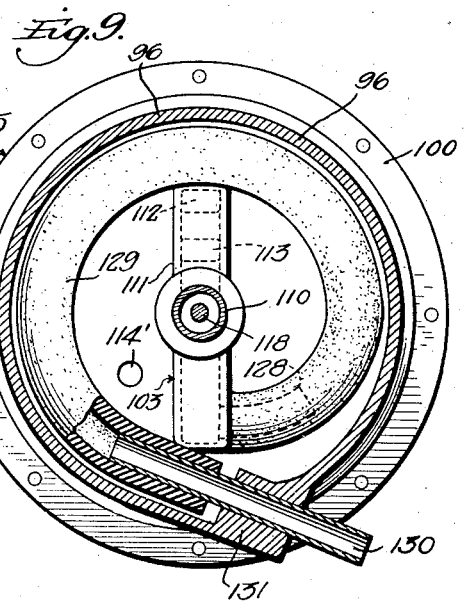
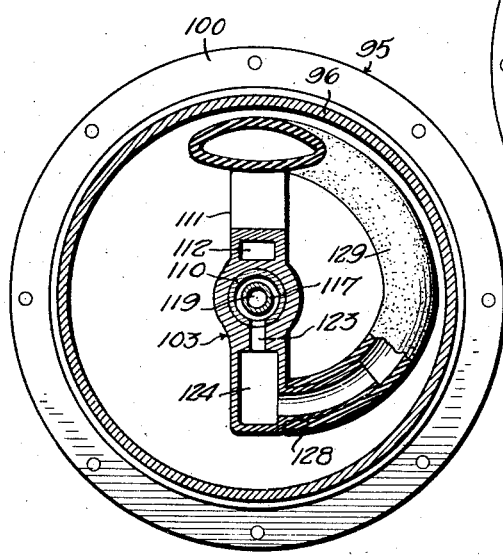
Inventor
HENRY BAADE Jan. 12, 1943.   H. BAADE   2,307,910
POWER MECHANISM
Filed Feb. 7, 1939   4 Sheets-Sheet 4

Inventor
HENRY BAADE

Patented Jan. 12, 1943

2,307,910

UNITED STATES PATENT OFFICE 2,307,910

POWER MECHANISM

Henry Baade, Detroit, Mich., assignor to Automatic Shifters, Inc., Richmond, Va., a corporation of Virginia Application February 7, 1939, Serial No. 255,124

5 Claims. (Cl. 121—41)

This invention relates to manually controlled power mechanisms, and more particularly to a differential fluid pressure operated mechanism having manual means for controlling the power mechanism through a suitable follow-up device.

In the operation of various forms of mechanical devices it is frequently necessary or desirable to provide power means for actuating a movable element thereof. In some such mechanical devices it is necessary, where power actuation is resorted to, to provide means for maintaining the movable elements of the mechanical device under the constant control of the operator as distinguished from automatic operation.

Mechanisms have been developed for this purpose wherein follow-up control devices are employed between the manually operable member and the power operated mechanism whereby the latter will partake of movement under the control of and to an extent proportional to the movement of the manually operable member. These mechanisms, however, frequently fail to completely satisfy requirements by failing to provide in the manually operable control member a "feel" which is proportionate to the resistance encountered by the power mechanism in actuating the member connected to be moved thereby. Attempts have been made to overcome this objection in mechanisms which are not wholly satisfactory since they are inherently incapable of duplicating in the manually operable control member a resistance which is accurately proportionate to the resistance encountered by the power mechanism. The failure of mechanisms of this character to provide the desired results is due to various causes, such as the necessary use of springs for returning parts to normal position, the necessity for unseating poppet valves against pressure, etc.

An important object of the present invention is to provide a simple form of power mechanism having a pressure movable element connected to apply force wherever desired and wherein a portion of the pressure movable member is employed for resisting movement of the manually operable member whereby the latter will be provided with resistance which is proportional to the resistance encountered by the pressure movable member in performing its intended function.

A further object is to provide a mechanism of this character wherein the use of a portion of the pressure responsive member for the purpose indicated accurately resists movement of the manually operable member to a degree which bears the same ratio to the resistance encountered by the pressure movable member as the area of the latter which is utilized for providing resistance in the manually movable member bears to the area of the pressure movable member as a whole.

A further object is to provide a mechanism of this character which operates in conjunction with a follow-up mechanism whereby the pressure movable member of the power mechanism partakes of movement to a degree proportional to movement imparted to the manually operable member.

More specifically, an important object of the invention is to provide a mechanism of the character referred to wherein the power mechanism is operated by differential fluid pressure which is controlled by a follow-up valve mechanism connected between the manually operable member and the pressure movable member of the power mechanism and wherein the pressure movable member embodies therein means directly connected to resist movement of the control valve away from its normal or neutral position by the manually operable member to a degree proportional to differential pressures existing in the power mechanism and wherein these pressures are directly proportional to resistances encountered in moving the member to be actuated.

A further object is to provide a mechanism of the character referred to wherein the power mechanism comprises a fluid pressure motor formed of a pair of casing sections having a pressure movable diaphragm arranged with its edges clamped between the casing section, and to utilize movement of the diaphragm as a whole to actuate an element to be moved and to utilize a portion of the area of the diaphragm in resisting movement of the manually operable handle to a degree proportional to differential pressures in the motor casing sections.

Other objects and advantages of the invention will become apparent during the course of the following description.

Figure 2:
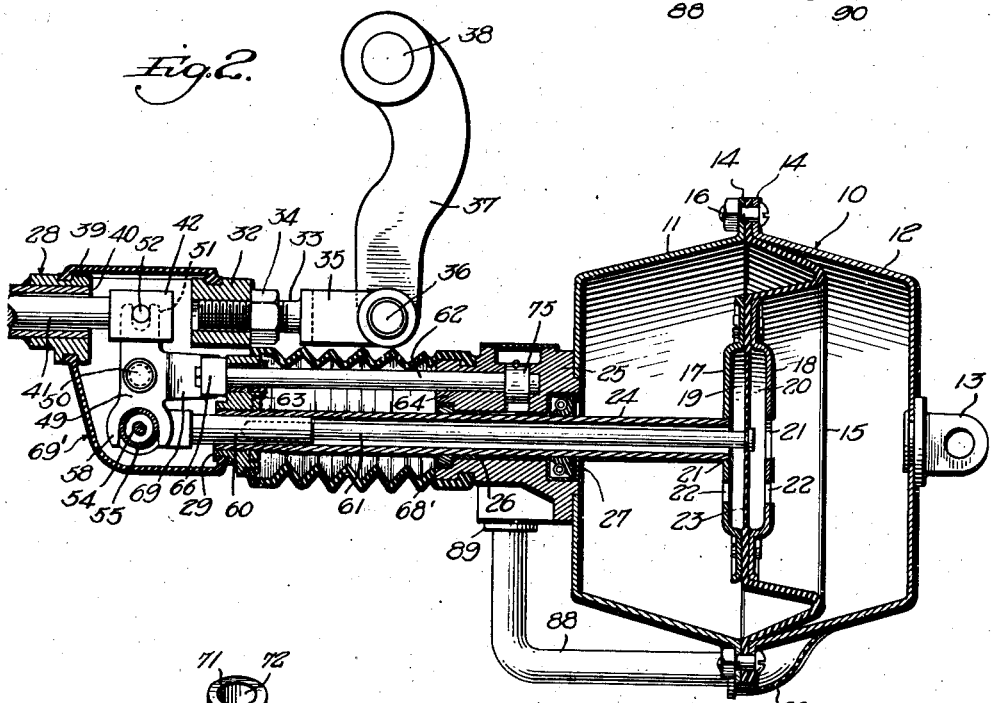
Figure 3:
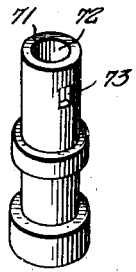
Figure 11:
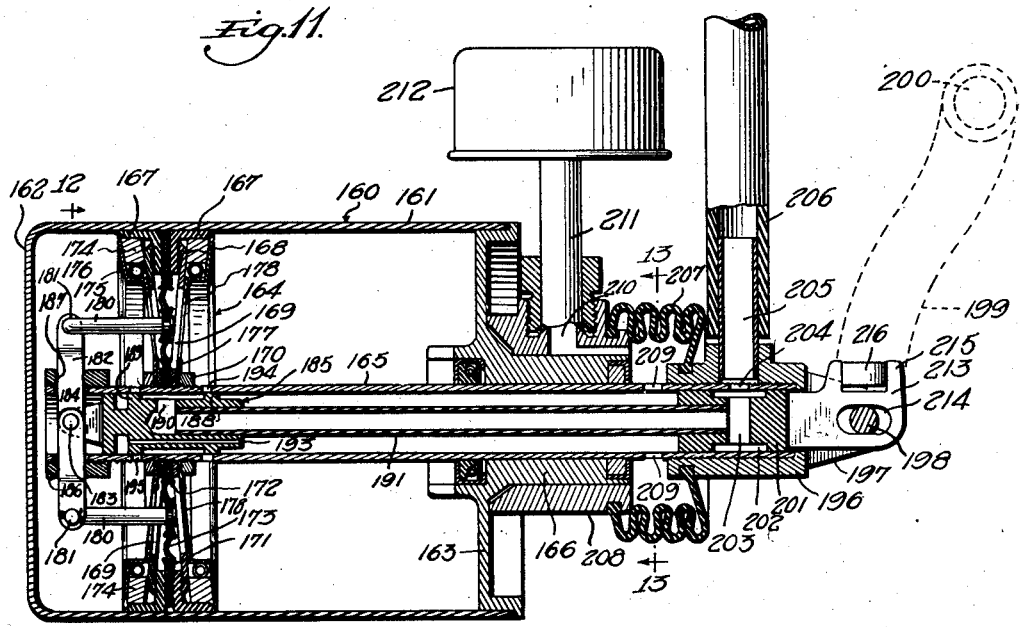
Figure 12:
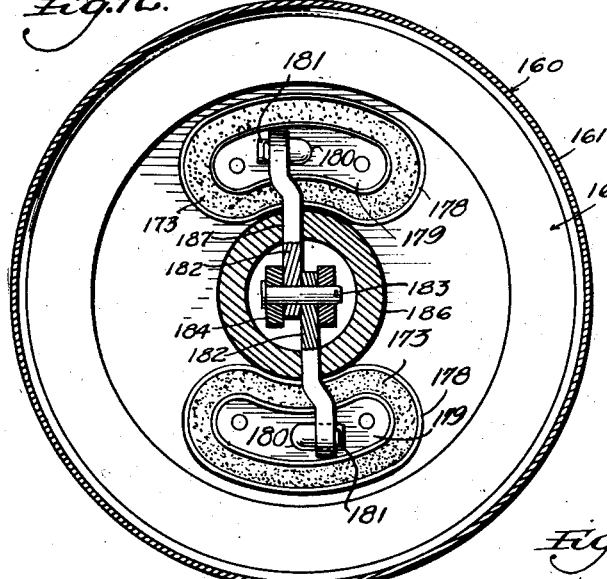
Figure 13:
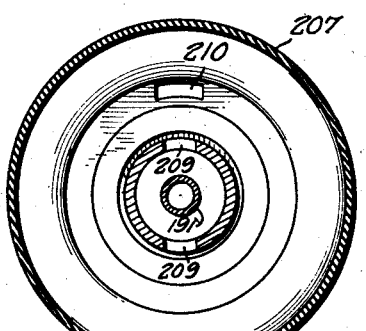
Figure 14:
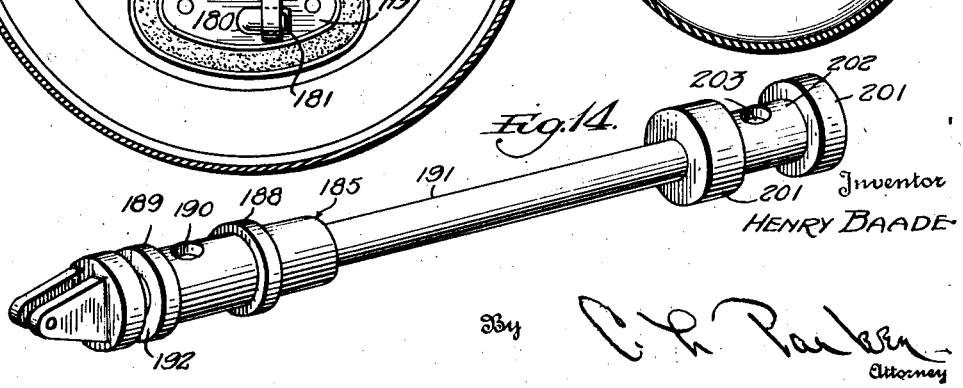

In the drawings I have shown several embodiments of the invention. In this showing:

Figure 1 is a side elevation of one form of apparatus showing its connection to a manually operable control handle, a portion of the rod connected to the handle being broken away, Figure 2 is an enlarged central vertical longitudinal sectional view through the power mechanism and associated elements, parts being shown in elevation, Figure 3 is a detail perspective view of the control valve, Figure 4 is a plan view of the power mechanism and associated elements, parts being shown in section, Figure 5 is an enlarged transverse vertical sectional view on line 5—5 of Figure 4, Figure 6 is a transverse sectional view on line 6—6 of Figure 4, Figure 7 is a similar view on line 7—7 of Figure 4, Figure 8 is a central vertical longitudinal sectional view similar to Figure 2 showing a modified form of apparatus, parts being shown in elevation, Figure 9 is a transverse vertical sectional view taken substantially on line 9—9 of Figure 8, Figure 10 is a similar view on line 10—10 of Figure 8, Figure 11 is a central vertical longitudinal sectional view through a further modified form of the invention, parts being shown in elevation and parts being broken away, Figure 12 is a transverse vertical sectional view on line 12—12 of Figure 11, parts being broken away, Figure 13 is an enlarged transverse vertical sectional view on line 13—13 of Figure 11, and, Figure 14 is a detail perspective view of a valve unit.

Referring to Figure 1 the numeral 10 designates a differential fluid pressure motor comprising casing sections 11 and 12 the latter of which may be provided with an eye 13 by means of which the motor may be mounted for swinging movement for a purpose which will become apparent. The casing sections 11 and 12 are shaped as shown in Figure 2 with their edges provided with outstanding annular flanges 14 between which is clamped the peripheral portion of a diaphragm 15 by bolts 16 or other fastening elements.

A pair of plates 17 and 18 are secured against opposite sides of the diaphragm 15 axially with respect to the casing sections 11 and 12, the plates 17 and 18 being cupped centrally thereof to provide chambers 19 and 20 for a purpose to be described. For economy in manufacture, the plates 17 and 18 are duplicates of each other and each is provided with an axial opening 21, for a purpose to be described, and with another opening 22 whereby each chamber 19 and 20 is maintained in communication with the interior of the corresponding motor casing section in order that the central portion of the diaphragm will be influenced by pressures existing in opposite ends of the motor.

The diaphragm 15 may be formed of any suitable material such as leather or rubber and is preferably formed of a rubber or other similar composition which permits the central portion 23 of the diaphragm to be made thinner than the portions arranged radially outwardly of the plates 17 and 18. In this connection it will become apparent that the latter portions of the diaphragm are preferably relatively heavy since they are called upon to effect movement of the piston rod to be described, whereas the central portion 23 of the diaphragm can be made relatively lighter to increase its sensitivity to pressures in the motor casing sections, the central portion of the diaphragm being called upon to exert substantially less work than the outer portion of the diaphragm.

A tubular piston rod 24 has one end mounted in the opening 21 of the plate 17 and preferably welded in position. As previously indicated, both of the plates 17 and 18 are provided with the openings 21 in order that either may be connected to the piston rod. As shown in Figures 2 and 5 a casting 25 is mounted against the casing section 11 axially thereof and is provided with a bearing 26 through which the piston rod 24 extends and is adapted to reciprocate. A pressure sealing ring 27 may be arranged in one end of the bearing 26 as shown in Figure 2. The casting 25 also houses the valve mechanism, to be described, for controlling the motor 10.

A crosshead indicated as a whole by the numeral 28 is preferably formed as an integral die casting and has a lower vertical extension 29 in which the free end of the piston rod 24 is threaded. The crosshead 28 further includes a pair of spaced side walls 30 and 31 (Figures 6 and 7) at the top of which is provided an integral cross member 32. A stem 33 is threaded into this cross member and is provided with a jamb nut 34. The other end of the stem 33 is formed as a yoke 35 for pivotal connection as at 36 to a crank arm 37. This crank arm is shown as being secured to a shaft 38 which is the element of the mechanism to be operated by the motor 10.

Spaced from the cross member 32 and in horizontal alignment therewith, the crosshead 28 is provided with a second cross member 39 in which is arranged a bearing sleeve 40. A rod 41 is axially slidable in the bearing 40 as shown in Figure 2. The end of the rod 41 between the cross members 32 and 39 is provided with a head 42 through which movement is imparted to the valve mechanism (to be described) for controlling the motor 10. The other end of the rod 41 is pivotally connected as at 43 to one end of a link 44. The other end of the rod 44 is pivotally connected as at 45 to the lower end of a lever 46. This lever is pivotally supported intermediate its ends as at 47 and has its upper end provided with a knob 48 adapted to be grasped by the hand of the operator. It will become apparent that the lever 46 constitutes the manually operable member of the apparatus. The rod 44 may be made of any desired length in order that the lever 46 may be arranged at a convenient point for manual operation.

A lever 49 is pivotally connected to the crosshead wall 30 as at 50 and the upper end of the lever 49 is offset as shown in Figure 7 and terminates in a fork 51 receiving a pin 52 (Figure 2) carried by the head 42. Accordingly it will be apparent that axial movement of the rod 41 will swing the lever 49 on its pivot 50. This movement of the lever 49 is employed for actuating the valve mechanism to be described.

Referring to Figure 7 the numeral 53 designates a pin extending across and through the crosshead walls 30 and 31 and provided intermediate its ends with a reduced portion 54 extending through a head 55 having an opening 56 therethrough somewhat larger than the reduced portion 54 of the pin. The head 55 is grooved as at 57 to receive a fork 58 formed on the lower end of the lever 49. A pair of cylindrical blocks 59 are arranged on the pin 53 between the head 55 and the crosshead walls 30 and 31. It will be apparent that the lever 49 is adapted to swing on its pivot 50 within limits defined by the difference between the diameter of the reduced pin portion 54 and the diameter of the opening 56. The head 55 is preferably integral with a projecting shank 60, slidable in the adjacent end of the piston rod 24, and a stem 61 is threaded at one end in the shank 60 and is fixed at its other end to the diaphragm portion 23, as shown in Figure 2.

A valve operating stem 62 is mounted to rock in bearings 63 and 64 formed respectively in the crosshead 28 and casting 25. The end of the stem 62 within the crosshead 28 is preferably squared as at 65 (Figures 6 and 7) for reception in a similarly shaped opening in a collar 66. This collar is provided with a horizontally extending arm 67 the end of which is arranged within forked ends 68 formed on a third arm 69 of the lever 49. Accordingly rocking movement of the lever 49 swings the arm 69 of this lever in a vertical plane to rock the stem 62 on its axis. A longitudinally expansible and contractible boot 68' is connected between the bearing 25 and head 29, while a rubber or similar boot 69' covers the crosshead 28. Accordingly it will be apparent that all of the working parts of the mechanism externally of the motor 10 are protected from dust and other foreign material.

Referring to Figure 5 the casting 25 is provided with a vertical valve sleeve 70 in which a valve 71 is mounted to reciprocate. This valve is provided with an axial passage 72 therethrough and the wall of the valve adjacent its upper end is provided with an opening 73 (Figures 2 and 5) to receive the end of an arm 74 carried by a collar 75 fixed to the stem 62. Accordingly rocking movement of the stem 62 will effect axial sliding movement of the valve 71.

The valve 71 is provided with a pair of spaced lands 76 and 77 controlling ports 78 and 79 respectively, these ports being formed in the valve sleeve 70. When the valve is in the normal position shown in Figure 5, the reduced upper end of the valve 71 affords limited communication between the port 78 and the interior of the upper end of the valve sleeve 70, while the lower port 79 is in limited communication with the same space through the axial opening 72 formed in the valve. The space above the valve communicates through an opening 80 formed in the valve sleeve with a chamber 81 formed in the casting 25, the arm 74 being arranged in this chamber and engaging the valve through the opening 80. The chamber 81 communicates with the atmosphere through a pipe 82, and if desired, this pipe may be provided with any suitable form of air cleaner (not shown). Accordingly it will be apparent that when the valve is in the normal position shown in Figure 5, both ports 78 and 79 are in reduced communication with the atmosphere.

The space between the lands 76 and 77 is in constant communication with a port 83 formed in the valve sleeve 70, and this port communicates through a port 84 in the casting 25 with a passage 85 leading to a pipe 86 (Figure 4) which is connected by any suitable means to a source of partial vacuum. Thus upon axial movement of the valve 71 in either direction, one of the ports 78 or 79 will be connected to the source of vacuum while the other port will remain in communication with the atmosphere.

The port 79 in the valve sleeve communicates with a passage 87 formed in the casting 25 and a pipe 88 has one end connected to the passage 87 preferably through a rubber nipple 89. The other end of the pipe 88 communicates with the interior of the motor casing section 12 through an offset 90. The port 78 (Figure 5) communicates with a passage 91 formed in the casting 25 and communicating with the interior of the casing section 11 through a suitable port 92.

A somewhat modified form of the invention is shown in Figures 8, 9, and 10 wherein the same type of motor is employed except that the valve mechanism is housed completely within the motor. Referring to Figure 8 the numeral 95 designates the fluid pressure motor as a whole comprising casing sections 96 and 97, the latter of which may be a stamping and may be provided with an eye 98 through which the motor may be supported for swinging movement.

The casing section 96 may be formed as a casting and may be integral with the piston rod bearing 99. The adjacent edges of the casing sections 96 and 97 are formed with outstanding peripheral flanges 100 between which is clamped the peripheral portion of a diaphragm 101 similar to the diaphragm 15 previously described and preferably provided with a relatively thin central portion 102. Instead of the plates 17 and 18 previously described, the diaphragm 101 is provided on opposite sides thereof with a casting 103 and a plate 104 clamped against opposite sides of the diaphragm, the plate 104 being cup shaped to provide a chamber 105 communicating with the interior of the casing section 97 through an opening 106. The plate 104 is provided with an offset portion providing a passage 107 communicating with an opening 108 formed in the diaphragm 101 for a purpose to be described.

The casting 103 is provided with an axial opening 109 to receive a tubular connecting rod 110 which may be made fast to the casting 103 in any suitable manner. The casting 103 is provided with an enlargement 111 projecting away from the diaphragm 101 and elongated vertically as shown in Figures 9 and 10. The upper portion of this enlargement is provided with a pair of passages 112 and 113, the former of which communicates with the opening 108 in the diaphragm and the latter of which communicates with a recess 114 formed in the casting 103. The recess 114 communicates with the interior of the casing section 96 through an opening 114' (Figures 8 and 9). The passages 112 and 113 communicate with the interior of the valve stem 101 through ports 115 and 116 respectively, the ends of the passages 112 and 113 adjacent the ports 115 and 116 preferably being annular and surrounding the connecting rod 110 whereby several of the ports 115 and 116 may be employed.

A valve 117 is threaded on the adjacent end of a stem 118 to be moved thereby in a manner to be described, the valve being slidable in the connecting rod 110 as shown in Figure 8. The valve is provided with an axial opening 119 closed at one end by a screw 120 through which the central portion of the diaphragm 101 is secured to the valve. The valve is provided with a pair of spaced lands 121 and 122 controlling the ports 115 and 116 and a space between the lands communicates with a vacuum passage 123 leading to a chamber 124 (Figure 10) to be referred to later.

The valve 117 is provided adjacent the respective lands 121 and 122 with ports 125 and 126 which are normally in slight communication with the ports 115 and 116 admitting air thereto when the valve is in the normal position shown in Figure 8. Air is always admitted into the outer end of the connecting rod 110 through ports 127 formed in the connecting rod outwardly of the bearing 99 in a manner to be described.

As shown in Figure 10, the enlargement 111 of the casting 103 is provided with a curved nipple 128 communicating with the chamber 124. This nipple is connected to one end of a flexible convolute hose 129. As shown in Figure 9, the other end of this hose is engaged with one end of a nipple 130, which is arranged substantially tangentially with respect to the hose 129. The nipple 130 extends through a thickened portion 131 of the casing section 96 and projects therebeyond for connection with a suitable pipe leading to a source of vacuum.

A head 132 is threaded on the free end of the connecting rod 110 and is provided with a pair of extended parallel arms 133 connected by a pin 134. A rubber or similar boot 135 is connected between the head 132 and the bearing 99 and is longitudinally expansible and contractible to permit axial movement of the connecting rod 110. The boot 135 obviously closes communication between the ports 127 and the outside atmosphere and this is desirable to prevent the entrance of dust or other foreign material into the valve mechanism. The bearing 99 is provided with a passage 136 communicating with a transverse port 137 which is preferably connected to a suitable air cleaner (not shown) to filter the air passing into the valve mechanism.

The valve actuating rod 118 (Figure 8) has its outer end threaded in a head 138 which is axially slidable in the adjacent end of the connecting rod 110. The head 138 is provided at its end with a circular portion 139 in which is formed a slot 140 through which the pin 134 extends, the slot being elongated longitudinally of the connecting rod 110 to permit free relative sliding movement of the connecting rod and stem 118 with respect to each other within limits to be referred to later.

A crosshead indicated as a whole by the numeral 141 is provided with a pair of depending arms 142 to which the ends of the pin 134 are connected whereby the crosshead is movable with and by the connecting rod 110. The crosshead 141 includes a block 143 in which is threaded a stem 144 held in fixed position by a jamb nut 145. The stem 144 is pivotally connected at its end as at 146 to a crank arm 147, similar to the crank arm 37 previously described, and connected to a shaft 148 which is the mechanical element to be actuated by the present mechanism.

The crosshead 141 includes a second head 149 carrying a bearing sleeve 150 in which the stem 151 is axially slidable. This stem corresponds to the stem 41 (Figures 1 and 2) and is intended to be manually operated as in the form of the invention previously described. The stem 151 carries a head 152 having a pin 153 engageable in the forked upper end 154 of a lever 155. This lever is pivotally connected as at 156 to one of the crosshead arms 142 and is forked at its lower end as at 157 to receive the circular end 139 of the head 138. Accordingly it will be apparent that sliding movement of the stem 151 will rock the lever 155 and thus impart axial movement to the valve operating stem 118 to move the valve in either direction from the neutral position shown in Figure 8. A boot 158 preferably is connected to the head 132 and blocks 143 and 149 to cover the operating elements associated therewith.

In Figures 11 to 14 inclusive the invention is illustrated as applied to a piston-type motor wherein a portion of the piston is utilized to provide the reaction through which manual operation of the valve mechanism is resisted in accordance with fluid pressures existing in the ends of the motor. Referring to Figure 11 the numeral 160 designates a fluid pressure motor as a whole comprising a cylinder 161 having an integral head 162 at one end and a detachable head 163 at the other end. A piston indicated as a whole by the numeral 164 is mounted to reciprocate in the cylinder and is connected to a tubular piston rod 165 reciprocable in a bearing 166 carried by the cylinder head 163.

The piston 164 comprises a pair of oppositely turned cups 167 urged toward each other by resilient plates 168 the peripheral edges of which turn toward each other as shown in Figure 11 for clamping engagement with the cups 167. Each plate 168 is provided with a circumferentially elongated opening 169. The radially inner portions of the plates 168 are secured to the piston rod 165 by clamping nuts 170.

Two plates 171 are arranged between the parallel flanges of the cups 167 and are provided with openings 172 coinciding with and corresponding in shape to the openings 169. A diaphragm 173 is clamped between the plates 171 as shown in Figure 11. The peripheral edges of the plates 168 serve to clamp the inner flanges of the cups 167 against the plates 171 and to clamp the latter plates against the diaphragm 173. The outer flanges of the cups 167 are maintained in snug engagement with the inner face of the cylinder 161 by compressible packing rings 174 urged outwardly by springs 175 arranged in the cupped peripheral portions 176 of plates 177, the radially inner portions of these plates being clamped against the adjacent plates 168 by the nuts 170. The plates 177 are provided with circumferentially elongated openings 178 shaped as shown in Figure 12. The various openings 169, 172 and 178 coincide in position with each other and are preferably of the same shape as the openings 178 as shown in Figure 12.

It will be apparent that the portions of the diaphragm 173 which are arranged within the openings 172 are exposed to pressures on opposite sides of the piston 164 and such portions of the diaphragm are utilized for resisting movement of the manually operable mechanism in accordance with differential pressures in the motor, as will become apparent. A pair of arcuate plates 179 are clamped against opposite sides of the diaphragm within each opening 178, the plates 179 corresponding generally in shape to but being smaller than the openings 178 as shown in Figure 12. An operating stem 180 is connected at one end to each pair of plates 179 centrally thereof and the other end of each stem 180 is pivotally connected as at 181 to a lever 182. Both levers 182 have their inner ends pivotally connected as at 183 to a yoke 184 carried by a valve member indicated as a whole by the numeral 185.

The end of the piston rod 165 adjacent the levers 182 is provided with a collar 186 threaded thereon and provided in opposite sides with openings 187 through which the levers 182 extend, the piston rod 165 obviously being provided with similar but larger openings for the levers 182. The surfaces of the openings 187 adjacent the edges of the levers 182 are curved as shown in Figure 11 to permit the levers to rock thereagainst. The levers 182 and stems 180 serve to connect the uncovered portions of the diaphragm 173 to the valve 185 whereby movement of the valve 185 will be properly resisted.

The valve member 185 is provided with a pair of lands 188 and 189, as shown in Figure 14, and the valve member between these lands is provided with a radial port 190 communicating with the adjacent end of a pipe 191 for a purpose to be described. Adjacent the land 189, the valve member is provided with an annular groove 192 and this groove communicates with the space around the pipe 191, at the opposite end of the valve member, through a port 193. The lands 188 and 189 respectively control ports 194 and 195 which communicate with the motor cylinder on opposite sides of the piston. In the embodiment of the invention illustrated the distance between the lands 188 and 189 is slightly greater than the distance between the closest limits of the ports 194 and 195 and accordingly when the valve 185 is in the neutral position shown in Figure 11 both ends of the motor cylinder communicate with the pipe 191. Since this pipe is connected to a source of vacuum, in a manner to be described, it will be apparent that when the valve 185 is in neutral position air is exhausted from both ends of the motor cylinder.

A head 196 is threaded on the outer end of the piston rod 165 and is provided with a pair of parallel arms 197 through which a pin 198 extends for connection with the crank arm 199 connected to the shaft 200 which is the element to be actuated by the fluid pressure motor. within the outer end of the piston rod 165 a head 201 is reciprocable and is connected to the outer end of the pipe 191. The head 201 is provided intermediate its ends with an annular groove 202 and a diametrical port 203 extends through the intermediate portion of the groove 202 for communication with the adjacent end of the pipe 191.

The piston rod 165 is provided intermediate the ends of the head 196 with a port 204 communicating with the groove 202. The head 201 obviously moves with the valve 185 but the groove 202 is ample in length to communicate at all times with the port 204. A nipple 205 is connected to the head 196 and communicates with the port 204, and a flexible hose 206 is connected between the nipple 205 and a suitable source of vacuum. The flexibility of the hose 206 permits the head 196 and associated elements to move upon actuation of the motor piston.

A longitudinally expansible and contractible boot 207 is connected at one end to the head 196 and at its other end to a sleeve 208 which fits over and is secured to the bearing 166. The boot 207 permits free sliding movement of the piston rod 165 in the bearing 166. Between the bearing 166 and the head 196 the piston rod 165 is provided with atmospheric openings 209 which are closed to direct communication with the atmosphere by the boot 207. The space within this boot, however communicates with a passage 210 formed in the sleeve 208 and this passage communicates through a pipe 211 with a suitable air cleaner 212 whereby only filtered air is admitted through the ports 209 to the valve mechanism.

The head 201 is provided with an extension 213, between the arms 197, and the extension 213 is provided with an elongated slot 214 through which the pin 198 extends. This construction permits independent movement of the valve 185 and piston rod 165 within reasonable limits during the normal operation of the apparatus. The extension 213 is provided with upstanding arms 215 receiving a suitable element 216 connected to and forming a part of a manually operable mechanism through which the valve assembly is operated.

The operation of the form of the invention shown in Figures 1 to 7 inclusive is as follows:

When it is desired to effect swinging movement of the shaft 38 in a clockwise direction the operator will move the handle 48 toward the right as viewed in Figure 1. This operation pulls the rod 44 toward the left as viewed in Figure 1, thus turning the lever 49 in a counter-clockwise direction to move the lever arm 69 upwardly. Referring to Figures 6 and 7 it will be apparent that this action moves the arm 67 upwardly to turn the shaft 62 in a clockwise direction, thus imparting similar movement to the arm 74 (Figure 5) to move the valve 71 upwardly.

Under such conditions the lower end of the valve will uncover the port 79 to a greater extent to the atmosphere through the valve passage 72, chamber 81 and atmospheric pipe 82. At the same time the upper land 76 will close the port 78 to the atmosphere around the upper end of the valve 71 and will open the port 78 to the vacuum space between the lands 76 and 77, this space communicating with the source of vacuum through passage 85. Accordingly the passage 91 (Figure 5) and port 92 (Figures 4 and 5) will be connected to the source of partial vacuum to exhaust air from the left hand end of the motor as viewed in Figures 1, 2 and 4. Accordingly the diaphragm 15 will start to move to the left as viewed in Figure 2.

Movement of the diaphragm 15 will be communicated through the connecting rod 24 to the crosshead 28 and thence to the crank 37 to turn the shaft 38 in a clockwise direction. As previously stated, the rod 41 will have been moved toward the left to turn the valve operating lever 49 in a counterclockwise direction. Upon movement of the diaphragm 15 and connecting rod 24 to the left the crosshead 28 will move to transmit similar movement to the pivot 50 of the crank 49 and accordingly this crank will move in the same direction that movement is being imparted to the pin 52 by manual operation of the rod 41. Accordingly the valve 71 will be moved in the manner described to one side of its neutral position and will remain out of neutral position to continue operation of the motor so long as movement of the rod 41 is continued by the operator. If the operator stops movement of the rod 41 the pivot pin 52 immediately becomes stationary, whereupon a slight additional movement of the diaphragm, transmitted to the lever 49 through the pin 50, will cause the lever 49 to turn in a counter-clockwise direction about the pin 52. Thus the lever arm 69 will reverse the previous rocking movement of the shaft 62 to restore the valve 71 to neutral position whereupon pressures will be balanced on opposite sides of the diaphragm 15 and movement of the parts will stop.

Thus it will be apparent that the diaphragm 15 is caused to partake of movement to a degree proportional to the degree of movement of the handle 48, the lever 49 and its connections providing a follow-up action through which the valve will energize the motor to cause it to move only so long as movement of the handle 48 is continued. It also will be apparent that the speed of movement of the diaphragm 15 will correspond to the speed of movement of the handle 48. Any tendency for the diaphragm 15 to move too rapidly will act in the same manner as when the manual operation of the rod 41 is stopped to tend to restore the valve 71 to neutral position and thus retard the speed of operation of the diaphragm 15. Conversely, any tendency for the diaphragm 15 to lag behind operation of the handle 48 will cause the lever 49 to turn to a greater extent about the pivot 50 to open the valve 71 to a greater extent, thus increasing the rate of evacuation of one end of the motor to increase the speed of movement of the diaphragm 15. Thus any desired extent of movement may be imparted to the crank 37 and this crank may be moved at any desired speed wholly under the control of the operator.

It will be apparent that the crank 37 and shaft 38 may be moved in a counter-clockwise direction by moving the handle 48 to the left as viewed in Figure 1. This operation will turn the lever 49 in a clockwise direction as viewed in Figure 2 thus reversing the previously described operation of the valve 71 by moving it downwardly from the neutral position shown in Figure 5 to maintain the left hand end of the motor in communication with the atmosphere and connect the right hand end of the motor to the source of vacuum. This operation obviously will cause movement of the diaphragm 15 toward the right and when the manual operation of the rod 41 is stopped, a slight additional movement of the diaphragm 15 to the right as viewed in Figure 2 will cause the pivot pin 50 to move the lever 49 and cause the latter to swing slightly in a counter-clockwise direction to restore the valve 71 to neutral position.

It is obvious that differential pressures will affect the whole of the diaphragm 15 to transmit force to the connecting rod 24 to perform the function of operating the crank 37. The central portion 23 of the diaphragm is connected by the rod 61 and stem 60 to the circular head 55 and this head is engaged by the forked lower end 58 of the lever 49. As previously described, movement of the stem 41 toward the left as viewed in Figure 2 results in movement of the diaphragm 15 in the same direction and accordingly differential pressures acting on the portion 23 of the diaphragm 15 will exert a force toward the left against the forks 58 of the lever 59, thus tending to oppose turning movement of the lever 49.

The force transmitted to the lower end of the lever 49 to resist turning movement of this lever by the operator will be proportional to the total force acting on the diaphragm 15 and this force in turn will be proportional to the resistance encountered by the motor in turning the shaft 38. Differential pressures in the motor will depend upon the areas of the ports 78 and 79 (Figure 5) which are uncovered by the valve and will also depend upon the area of the diaphragm 15 and its rate of movement by which it tends to satisfy the partial vacuum created in one side of the motor. The area of the diaphragm being constant, it will be apparent that if the valve is held in a given position to one side of its neutral position, differential pressures in the motor will vary in accordance with resistance to the movement of the diaphragm 15.

For example, assuming that the valve 71 occupies a position above the neutral position shown in Figure 5 to connect the left hand side of the motor as viewed in Figure 2 to the source of vacuum, the rate at which the diaphragm 15 moves will depend upon the resistance which it encounters. If the resistance is relatively slight the diaphragm will move freely thus tending to satisfy the partial vacuum in the left hand end of the motor and accordingly only slight differential pressures will be built up. The diaphragm portion 23 will offer correspondingly slight resistance to movement of the handle 48 by the operator. On the other hand, if the diaphragm 15 meets with greater resistance in turning the crank 37 movement of the diaphragm will be retarded whereby a given rate of expansion of air from the left side of the motor will result in a rapid drop in pressure, depending upon the degree of increased resistance, and accordingly the pressure differential on opposite sides of the diaphragm will increase and the diaphragm portion 23 will offer correspondingly increased resistance to movement of the handle 48 by the operator. Thus it will be apparent that the mechanism described provides the handle 48 with "feel" whereby the operator may control the operation of the handle in accordance with the resistance encountered by the motor. Thus the operator is enabled to maintain turning movement of the shaft 38 perfectly under his control and accordingly the apparatus functions in the same manner as if the operator manually turned the shaft 38 except that the manual force required is materially reduced.

As previously stated, the opening 21 is formed in the plate 18 solely in order that this plate may be a duplicate of the plate 17 thus eliminating the necessity for making separate plates. The openings 22 are formed in both plates 17 and 18 so that either may be arranged to receive the connecting rod 24 and still provide an opening communicating with the adjacent side of the motor. The eye 13 is provided on the motor to permit the latter to alter its position in accordance with swinging movement of the crank 37. This eye obviously may be used where the element to be actuated partakes of linear movement, or it may be eliminated and the motor anchored to a suitable support.

The lost motion between the reduced stem portion 54 (Figure 7) and the head 55 permits the lever 49 and head 55 to move independently of the crosshead 28, a sufficient distance to effect actuation of the valve mechanism in the manner described. In the event of a failure in power in the apparatus, the operator may move the handle 48 until the head 55 contacts with the reduced stem portion 54, whereupon further movement of the handle 48 will transmit movement to the pin 53 and thus to the crosshead 28 to manually turn the lever 37.

The operation of the form of the invention shown in Figures 8, 9 and 10 is similar to the operation of the form just described and need not be referred to in detail. Upon operation of the rod 151 by a handle similar to the handle 48 connected thereto the lever 155 will be rocked on the pivot 156 carried by the arms 142 of the crosshead 141, whereupon the valve actuating rod 118 will move to connect the ports 115 and 116, to the source of partial vacuum and the atmosphere, depending upon the direction of movement of the rod 118. If this rod is moved to the right, the land 121 will increase the degree of communication between the port 115 and the atmosphere through ports 127 and passages 136 and 137, while the land 122 of the valve will uncover the port 116 to the vacuum space between the lands 121 and 122, this space being connected to the source of partial vacuum through passage 123 and through the flexible convolute hose 129. Under such conditions, the diaphragm 101 will move toward the left since air pressure will be present in the casing section 97 while air will be exhausted from the casing section 96.

Accordingly the initial movement of the valve 117 toward the right is followed by movement of the diaphragm 101 and the parts connected thereto to the left. The latter movement is transmitted through the connecting rod 110 to the head 132 and thence to the arms 142 to move the pivot 156 toward the left, which corresponds to the direction of movement being manually imparted to the rod 151. Therefore, movement of the pin 156 toward the left under the conditions referred to tends to prevent any further turning movement of the lever 151 about the pivot 156 and thus the head 132, crosshead 141 and the elements associated therewith will move bodily toward the left, the valve 117 being carried in the same direction and maintained out of neutral positions so long as movement is imparted to the rod 51.

When movement of the rod 151 is stopped, the pivot 153 becomes stationary. Acordingly slight further movement of the diaphragm 101 and connecting rod 110 toward the left will move the pivot pin 156 to turn the lever 155 about the pivot 153. Thus the lower end of the lever 151 will pull the valve actuating rod 118 to the left until the valve 117 is restored to neutral position to balance pressures on opposite sides of the diaphragm 101. Movement of this diaphragm will then be arrested pending subsequent movement of the rod 151 in either direction by the operator. It will be apparent that the flexibility and shape of the hose 129 will permit free movement of the diaphragm 101.

The operation just described takes place upon manual operation of the rod 151 to move the valve actuating rod 118 toward the right. As previously stated this operation exhausts air from the casing section 96, which communicates with the chamber 114, and admits air into the casing section 97, which communicates with the chamber 105. Thus so long as the valve 117 remains to the right of its neutral position as viewed in Figure 8 there will be a partial vacuum in the chamber 114 and atmospheric pressure in the chamber 105 and the differential pressures thus affecting the central diaphragm portion 102 will urge the valve 117 toward the left to provide the operator with the desired "feel" in the manually operable handle. The resistance which the operator feels to manual operation of the valve mechanism will depend directly upon differential pressures in the motor 95 which, in turn, will depend upon resistances encountered by the motor in operating the crank 147. The resistance which the operator feels therefore will be accurately proportional to the resistance encountered by the motor in turning the crank 147 as described in connection with the form of the invention shown in Figures 1 to 7 inclusive.

The motor operates in a similar manner when the stem 118 is manually moved to the left as viewed in Figure 8. Under such conditions a partial vacuum will be established in the casing section 97 while air is admitted to the casing section 96 and the diaphragm 101 and the ports connected thereto will move toward the right. This movement is utilized in the manner previously described for moving the pivot pin 156 to tend to move the valve actuating stem toward the right to provide a follow-up action of the valve 117. When manual operation of the rod 151 is stopped slight additional movement of the diaphragm 101 to the right will move the pivot pin 156 in the same direction and the lower end of the lever 155 will restore the valve 117 to neutral position. The central portion 102 of the diaphragm is again utilized for resisting manual operation of the valve to a degree proportional to resistance encountered by the motor in turning the crank 147. When the operator effects movement of the stem 118 toward the left as described, air pressure in the chamber 114 while a partial vacuum is present in the chamber 105 will tend to move the central diaphragm portion 102 to the right to provide the desired resistance. As in the form of the invention previously described a portion of the pressure responsive member of the motor is utilized for resisting movement of the valve in either direction by the operator whereby the perfect follow-up action of the valve mechanism is accompanied by the highly desirable "feel" whereby the direct manual operation of the lever 147 is simulated with a substantial reduction in the amount of work which must be performed by the operator.

The lost motion provided between the pin 134 and slot 140 is never completely taken up during the normal operation of the device. In the event of a failure in power in the motor, however, the operator may move the rod 151 to turn the lever 155 in either direction to take up play between the pin 134 and slot 140, whereupon further manual movement of the rod 151 will effect bodily movement of this rod and the crosshead 141 to manually turn the lever 147.

The operation of the form of the invention shown in Figures 11 to 14 inclusive is quite similar to the operation of the device shown in Figures 8, 9 and 10 except that a cylinder and piston-type motor is employed. Moreover, since no lever similar to the lever 155 is employed for reversing the direction of movement of the valve to provide the necessary follow-up action, there is a direct follow-up action provided between the valve and the ports of the connecting rod 165. This construction requires a reversal of the application of the forces resisting manual movement of the valve and this is accomplished by the use of the levers 182 as will become apparent.

Manual movement of the head 201 (Figure 11) to the right causes the land 189 to open the ports 195 to the atmosphere through the passage 193, port 209, passage 210 and the air cleaner 212. At the same time, the land 188 will increase communication between the ports 194 and the source of vacuum through the space between the lands 188 and 189, through the tubular rod 191, port 204 and flexible hose 206. Air will be admitted to the motor at the left side of the piston 164 as viewed in Figure 11 and air will be exhausted from the right hand end of the cylinder. Movement of the valve 185 to the right will thus be followed by movement of the piston in the same direction and it will be obvious that movement of the valve a given distance will be accompanied by movement of the piston exactly the same distance to restore the valve to its neutral position and thus stop movement of the piston 164.

A portion of the piston is formed of the portions of the diaphragm 173 which are arranged in the openings 172. Under the operating conditions described the partial vacuum in the right hand end of the cylinder 161 and the atmospheric pressure in the left hand end of the cylinder will move the piston 164 to the right and the same differential pressure will tend to move the uncovered portions of the diaphragm 173 in the same direction. Thus the stems 180 will be moved to the right to transmit a force through the pin 183 to tend to move the valve 185 toward the left thus opposing movement of this valve to the right by the operator.

Movement of the piston 164 to the left obviously is accomplished by manual movement of the valve 185 in the same direction to exhaust air from the left hand end of the cylinder 161 and admit air to the right hand end thereof. Then it will be apparent that the piston will partake of movement exactly equal to the movement of the valve 185 by the operator, whereupon the neutral position of the valve 185 will be re-established to stop the movement of the piston. The same differential pressures which move the piston to the left will act against the uncovered portions of the diaphragm 173 to tend to move the stems 180 to the left and thus apply a force acting toward the right against the valve 185 to oppose movement thereof by the operator. Thus the operator will always feel a resistance against manual movement of the valve which will be proportional to the resistance encountered by the piston 164 in turning the crank 199 as described in connection with the other forms of the invention.

From the foregoing it will be apparent that each form of the invention will operate to provide a perfect follow-up valve operation through which the pressure movable member of the motor will move a distance corresponding to the distance through which the operator moves the manually operable handle. Moreover, a predetermined portion of the area of the pressure movable element of the motor in each form of the invention is utilized for transmitting a reaction force to the valve to oppose movement thereby by the operator. The force thus exerted against the valve will be only a portion of the force acting against the pressure movable element of the motor depending upon the portion of the area of the pressure movable element which is utilized for this purpose. As explained in connection with the form of the invention shown in Figures 1 to 7 inclusive the resistance offered against manual operation of the valve in each case will be proportional to differential pressures in the motor, which, in turn, are proportional to the resistance encountered by the motor in moving the element to be actuated. Therefore the resistance felt by the operator likewise will be proportional to the resistance encountered by the motor in moving the element to be actuated, thereby providing the operator with highly accurate feel. In this connection it will be apparent that there are no forces other than negligible friction which the operator must overcome in moving the valve of either form of the invention away from its neutral position. In other words, the only resistance which the operator will feel will be that applied to the valve by the portion of the pressure movable element of the motor employed for this purpose, and accordingly the "feel" in the manually operable handle is always accurate.

It is to be understood that the forms of the invention herewith shown and described are to be taken as preferred examples of the same, and that various changes in the shape, size and arrangement of parts may be resorted to without departing from the spirit of the invention or the scope of the subjoined claims.

I claim:

1. In a manually controlled power mechanism, a differential fluid pressure motor having a pressure movable member therein adapted to be connected to a device to be actuated, a control valve mechanism for said motor, a manually operable mechanism, lever means connecting said valve mechanism to said pressure movable member and to said manually operable mechanism to cause said valve mechanism to partake of a follow-up action whereby said pressure movable member will move to an extent proportional to movement of said manually operable mechanism, and means connected to transmit to said lever means forces exerted by differential pressures acting against a portion of the area of said pressure movable member to resist operation of said lever means by said manually controlled mechanism to an extent proportional to differential pressures affecting said pressure movable member.

2. In a manually controlled power mechanism, a differential fluid pressure motor having a pressure movable member therein adapted to be connected to a device to be actuated, a control valve mechanism for said motor, a manually operable mechanism, lever means connecting said valve mechanism to said pressure movable member and to said manually operable mechanism to cause said valve mechanism to partake of a follow-up action whereby said pressure movable member will move to an extent proportional to movement of said manually operable mechanism, said pressure movable member having a flexible portion, and means directly connecting such flexible portion to said lever means to resist turning movement thereof by said manually operable mechanism in accordance with differential pressures affecting said flexible portion of said pressure movable member.

3. In a manually controlled power mechanism, a fluid pressure motor having a pressure movable diaphragm adapted to be connected to a device to be actuated, a control valve mechanism for said motor, a manually operable mechanism, lever means having mechanical connection with said valve mechanism, said diaphragm and said manually operable mechanism whereby said valve mechanism is caused to partake of a follow-up action to cause said diaphragm to move to an extent proportional to movement of said manually operable mechanism, and a pair of cupped members having their peripheral portions clamped against opposite sides of said diaphragm and forming with the portion of the diaphragm within said members a pair of chambers respectively communicating with the ends of said motor on opposite sides of said diaphragm, the portion of said diaphragm within said members having mechanical connection with said lever means to resist movement thereof by said manually operable mechanism to a degree proportional to differential pressures affecting said portions of said diaphragm.

4. In a manually controlled power mechanism, a differential fluid pressure motor having a casing and a pressure movable unit therein movable in opposite directions, control valve mechanism, comprising a pair of elements, for selectively connecting opposite ends of said motor to a source of pressure differential, a manual mechanism for moving one valve element, the other valve element being operable by said pressure movable unit whereby the latter partakes of a follow-up action with respect to said manual mechanism in either direction of movement thereof, said pressure movable unit comprising a relatively rigid structure, ported to cooperate with said valve mechanism to form the sole means whereby the latter controls pressures in opposite ends of said motor, an annular flexible diaphragm section secured at its inner edge to said rigid structure and at its outer edge to said casing, and a second diaphragm section having mechanical connection axially thereof with said first named valve element, said rigid structure being ported whereby said second diaphragm section is influenced by pressures affecting said annular diaphragm section to subject said first named valve element to resistances against movement in either direction proportional to differential pressures in said motor, said second named diaphragm section comprising the sole means for resisting movement of said manually operable mechanism.

5. In a manually controlled power mechanism, a differential fluid pressure motor having a casing, a pressure movable unit therein, and a tubular piston rod connected to said unit, a control valve mechanism for selectively connecting opposite ends of said motor to a source of pressure differential, said valve mechanism comprising a manually movable valve element slidable in said tubular piston rod and said tubular piston rod being ported to cooperate with said valve element and movable with said pressure movable unit in a follow-up action with respect to said valve element in either direction of movement thereof, a manual mechanism for moving said valve element, said pressure movable unit comprising a body and a cap fixed with respect thereto and having passages connecting the ports in said tubular piston rod to the respective ends of said casing and forming the sole means whereby said valve mechanism controls pressures in opposite ends of said casing, an annular diaphragm having its inner edge arranged between said body and said cap and its outer edge connected to said casing, a second diaphragm between said body and said cap connected to said valve element, said body and said cap being ported whereby said second diaphragm is influenced by pressures in the respective ends of said casing, said second diaphragm comprising the sole means for resisting movement of said manual mechanism.

HENRY BAADE.